(12) United States Patent
Beckman et al.

(10) Patent No.: US 8,269,762 B2
(45) Date of Patent: Sep. 18, 2012

(54) ALMOST RECTANGULAR TRIANGULATIONS

(75) Inventors: Brian C. Beckman, Newcastle, WA (US); Andrew D. Reddish, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1015 days.

(21) Appl. No.: 12/247,707

(22) Filed: Oct. 8, 2008

(65) Prior Publication Data

US 2010/0086208 A1 Apr. 8, 2010

(51) Int. Cl.
*G06T 1/00* (2006.01)
*G06T 15/00* (2006.01)
*G06T 17/20* (2006.01)

(52) U.S. Cl. .................. 345/418; 345/419; 345/423

(58) Field of Classification Search .................. None
See application file for complete search history.

(56) References Cited

U.S. PATENT DOCUMENTS

| | | | |
|---|---|---|---|
| 5,923,777 A | 7/1999 | Chun et al. | |
| 6,075,541 A | 6/2000 | Maclinovsky | |
| 6,445,390 B1 | 9/2002 | Aftosmis et al. | |
| 6,804,635 B1 | 10/2004 | Dhondt | |
| 2007/0291233 A1 | 12/2007 | Culbertson | |
| 2008/0036760 A1 | 2/2008 | Smith et al. | |

OTHER PUBLICATIONS

R. Pajarola, M. Antonijuan, and R. Lario, "QuadTIN: Quadtree based Triangulated Irregular Networks", Nov. 1, 2002, IEEE, Proceedings IEEE Visualization 2002, pp. 395-402.*

Bern et al., Mesh Generation and Optimal Triangulation, http://www.ics.uci.edu/~eppstein/pubs/BerEpp-CEG-95.pdf, accessed Aug. 7, 2008 (78 pages).

Roitzsch et al., BOXES A Program to Generate Triangulations from a Rectangular Domain Description, Dec. 1990, http://www.zib.de/Publications/Reports/TR-90-09.ps.Z (20 pages).

Persiano et al., An Adaptive Triangulation Refinement Scheme and Construction, 1993, Laboratório de Computação Gráfica, Rio de Janeiro, Brasil, http://graphics.stanford.edu/~comba/papers/adptri93.pdf.

Pajarola, Renato, Overview of Quadtree-Based Terrain Triangulation and Visualization, Jan. 2002, Computer Graphics Lab, Information & Computer Science Department, University of California Irvine, http://www.ifi.uzh.ch/vmml/admin/upload/UCI-ICS-02-01.pdf (16 pages).

* cited by examiner

*Primary Examiner* — Ulka Chauhan
*Assistant Examiner* — Robert Bader
(74) *Attorney, Agent, or Firm* — Workman Nydegger (57) ABSTRACT

Triangulating quadrilaterals. A method includes accessing an irregular grid comprising a plurality of irregular quadrilaterals. A determination is made that each of the irregular quadrilaterals in the irregular grid is not a concave and is a convex quadrilateral. On a grid basis and as a result of determining that each of the irregular quadrilaterals in the irregular grid is not a concave and is a convex quadrilateral, each of the irregular quadrilaterals in the irregular grid is triangulated to create a triangular mesh by defining diagonals from at least one vertex point of each of the irregular quadrilaterals in the irregular grid to the diagonally opposed vertex point of the same irregular quadrilateral. The triangular mesh is stored in a computer readable storage medium that can be accessed by an application for performing tasks related to data visualization, computer graphics, computational geometry, etc.

20 Claims, 8 Drawing Sheets

ALMOST RECTANGULAR TRIANGULATIONS

BACKGROUND

Background and Relevant Art

Computers and computing systems have affected nearly every aspect of modern living. Computers are generally involved in work, recreation, healthcare, transportation, entertainment, household management, etc.

Many algorithms in data visualization, computer graphics, and computational geometry require triangle meshes. Such meshes can approximate arbitrary curved surfaces with piecewise linear planar patches. To ensure linearity and planarity, triangles are used. Approximating a general surface with a collection of triangular patches is referred to as triangulation. There are many well known computational algorithms for triangulation. Such algorithms, in general, can be very complex, slow, and exposed to numerical hazards.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment is directed to a method practiced in a computing environment. The method is a computer implemented method of triangulating quadrilaterals. The method includes accessing an irregular grid comprising a plurality of irregular quadrilaterals. A determination is made that each of the irregular quadrilaterals in the irregular grid is not a concave and is a convex quadrilateral. On a grid basis and as a result of determining that each of the irregular quadrilaterals in the irregular grid is not a concave and is a convex quadrilateral, each of the irregular quadrilaterals in the irregular grid is triangulated to create a triangular mesh by defining diagonals from at least one vertex point of each of the irregular quadrilaterals in the irregular grid to the diagonally opposed vertex point of the same irregular quadrilateral. The triangular mesh is stored in a computer readable storage medium that can be accessed by an application for performing tasks related to data visualization, computer graphics, computational geometry, etc.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Consider a collection of data points, indexed by i, each of which is a list of three coordinate values, (x[i], y[i], z[i]), constituting samples of a function of two variables in three dimensions, $f(x, y)=z$. A triangulation is a collection of triples of indices, each of which specifies three of the data points constituting one triangle in a mesh. Equivalently, the triangulation is an adjacency graph listing the set of vertices adjacent to each vertex. Some embodiments described herein robustly and efficiently compute a triangulation when the x and y values of the original data points are "nearly" rectangular, meaning that they are displaced from a regular, rectangular grid by small amounts, where "small" is defined further below. In particular, "small," in some embodiments, is defined as displacements that do not result in concave quadrilaterals, or that do result in convex quadrilaterals. Some embodiments may further include functionality for computing interpolated values of the function $f(x, y)$ along with the computation of the triangulation.

In particular, some embodiments disclosed herein are directed to recognizing when quadrilaterals in a grid exhibit certain features that allow a simple triangulation process to be performed on all quadrilaterals in a grid, on a grid basis. In particular, some embodiments are directed to triangulation of irregular grids. An irregular grid is a grid which includes one or more irregular quadrilaterals, which are not rectangular quadrilaterals. By recognizing that each of the irregular quadrilaterals is convex and not concave, or by forcing each of the irregular quadrilaterals in the irregular grid to be convex and not concave, a simple triangulation process can be performed whereby triangles are formed by defining diagonals from and to vertex points of quadrilaterals in the irregular grid.

Figure 1:
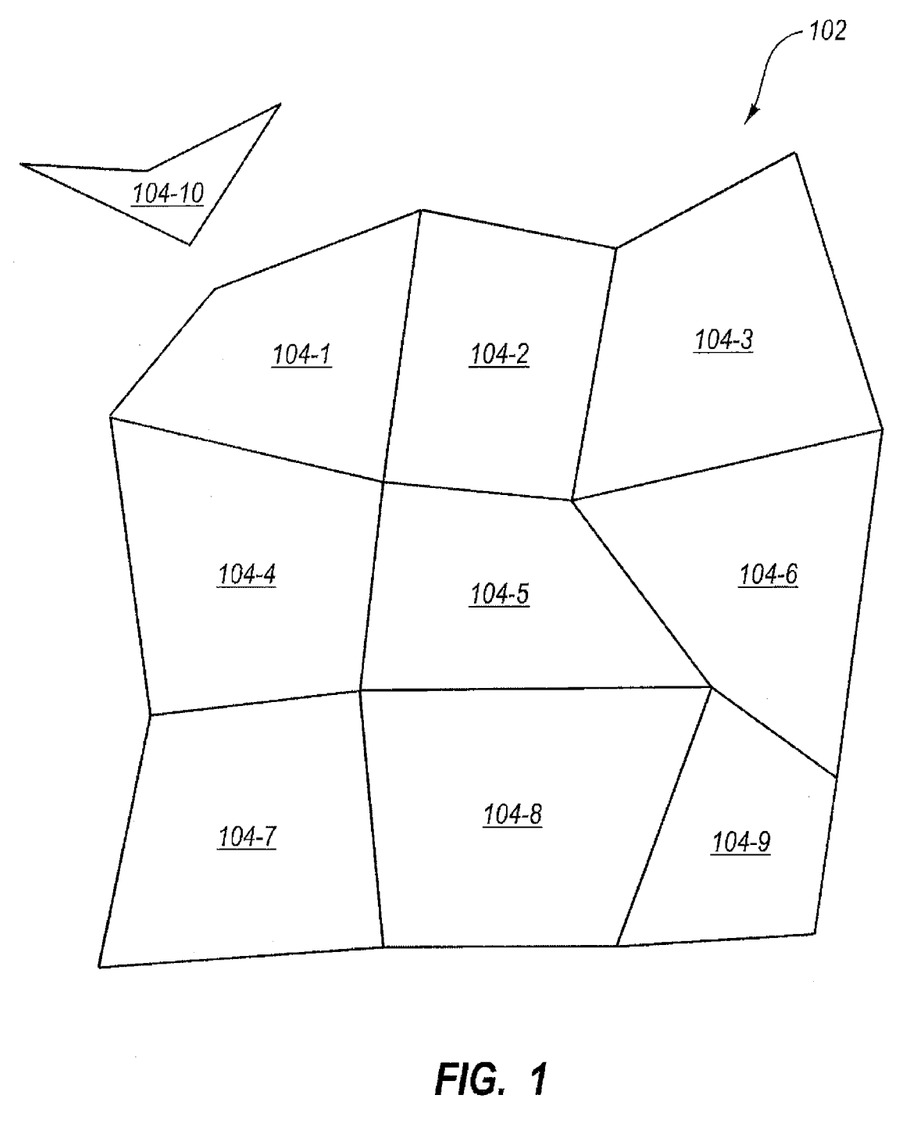
FIG. 1 illustrates an irregular grid including irregular quadrilaterals.

Referring now to FIG. 1, an irregular grid 102 is illustrated. The irregular grid includes a plurality of irregular quadrilaterals 104. Notably, irregular quadrilaterals are identified generally as 104 and specifically by 104-X where X is a specific designator. For example, the irregular quadrilaterals illustrated in the irregular grid 102 in FIG. 1 are identified specifically as 104-1 through 104-10.

A determination can be made that none of the irregular quadrilaterals 104 in the irregular grid 102 is concave. Rather, each of the irregular quadrilaterals 104 in the irregular grid 102 is convex. For illustration purposes, FIG. 1 illustrates a concave irregular quadrilateral 104-10. By inspection, one can determine that the concave irregular quadrilateral 104-10 includes a portion of the quadrilateral that is indented into the concave irregular quadrilateral 104-10, while the convex quadrilaterals 104-1 through 104-9 do not include an indented portion. One formal rule for determining if an irregular quadrilateral is concave will be discussed in more detail below.

By determining that all of the quadrilaterals 104 in the grid 102 are convex, and that they are not concave, a simple triangulation process may be performed by drawing diagonal lines from vertex points of the irregular quadrilaterals to diagonally opposing vertex points. This may be accomplished by drawing a single diagonal for irregular quadrilaterals 104 in the irregular grid 102 and/or drawing both diagonals for irregular quadrilaterals 104 in the irregular grid 102.

Figure 2:
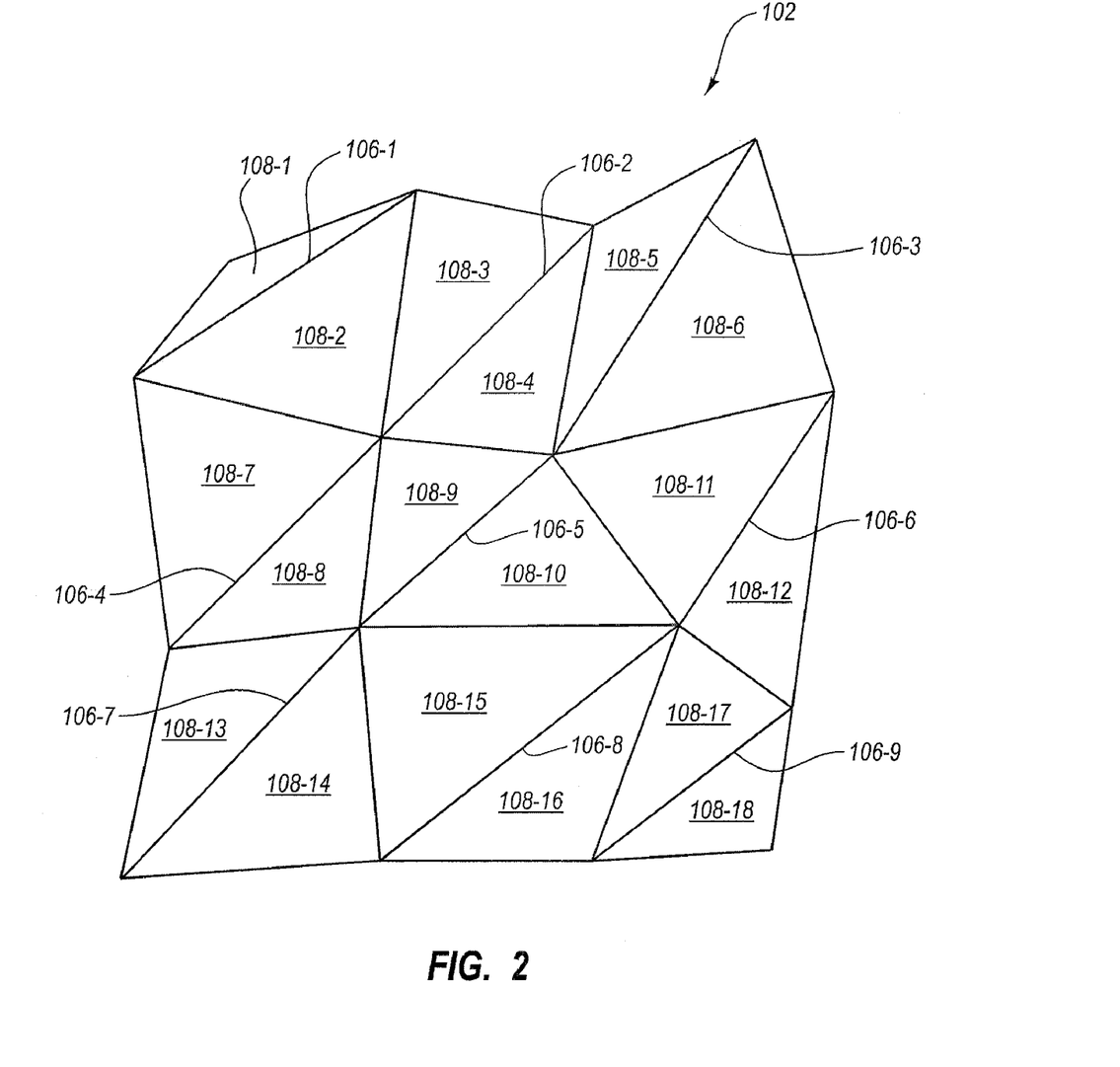
FIG. 2 illustrates a biased triangulation of the irregular grid.

For example, reference is now made to FIG. 2, which illustrates diagonals, designated generally as 106 and specifically as 106-X including 106-1 through 106-9. The diagonals 106 in the example illustrated in FIG. 2 each are defined from the lower left hand vertex points of the irregular quadrilaterals 104 of the irregular grid 102 to the diagonally opposed upper right hand vertex points to form triangles 108-1 through 108-16. When all of the diagonals are oriented the same, i.e. defined by corresponding vertex points of each irregular quadrilateral (e.g. from bottom left vertex points to top right vertex points), the result is a biased triangulation biased in a general direction.

To combat and reduce the bias, a number of alternative triangulation steps may be implemented. In one example, diagonals may be alternated according to some pattern. For example, the diagonals 106-1, 106-3, 106-5, 106-7, and 106-9, may be from the bottom left vertex point to the top right vertex point as shown in FIG. 2 while diagonals 106-2, 106-4, 106-6, and 106-8 may extend from the top left vertex point to the bottom right vertex point. Other alternations may be used, such as alternating every second diagonal or some other alternation. In some embodiments, selection of a diagonal may be based on a randomization scheme or pseudo-randomization scheme, where orientation, i.e. from bottom left to top right, or from top left to bottom right, is based on a random or pseudo-randomly generated number. As noted, these techniques may help to mitigate any bias caused by the triangulation.

Figure 3:
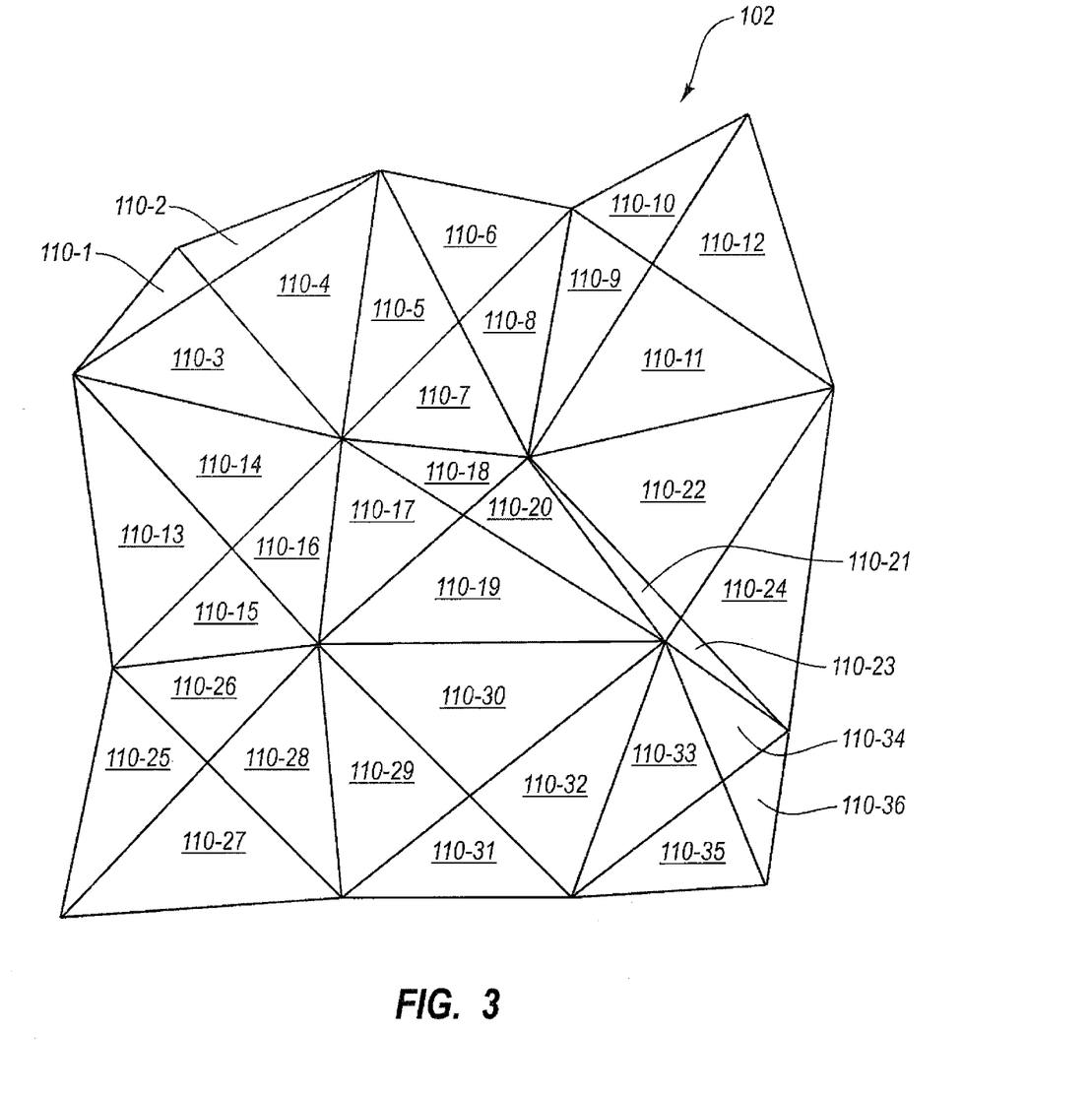
FIG. 3 illustrates an un-biased triangulation of the irregular grid.

Referring now to FIG. 3, an alternative triangulation process is illustrated. In FIG. 3, the triangulation process generates four triangles 110 for each irregular quadrilateral 104 (See FIG. 1) by defining both diagonals 106 for each quadrilateral 104. For example, for irregular quadrilateral 104-1, both diagonals 106-1 and 106-10 are defined. This results in the creation of triangles 110-1, 110-2, 110-3, and 110-4. Defining both diagonals results in an unbiased triangulation being performed.

In the example illustrated above, the irregular grid is simply accessed and a determination is made as to whether or not the quadrilaterals 104 in the irregular grid are convex. So long as the irregular quadrilaterals 104 are convex, and not concave, then one or more of the triangulation techniques described above are applied to the irregular quadrilaterals 104.

In other embodiments, quadrilaterals, or at least points defining quadrilaterals, may be obtained from an oracle. In these embodiments, additional options are available. After obtaining points from an oracle, a determination may be made that the points define a concave or not convex irregular quadrilateral. Embodiments include functionality for simply not performing the triangulation using the techniques described above when oracle points define a concave or not convex irregular quadrilateral, or alternatively, embodiments may include functionality for approximating new points in place of the points from the oracle, that do not result in concave, non-convex irregular quadrilaterals, such that the triangulation techniques described above may be used.

Figure 4A:
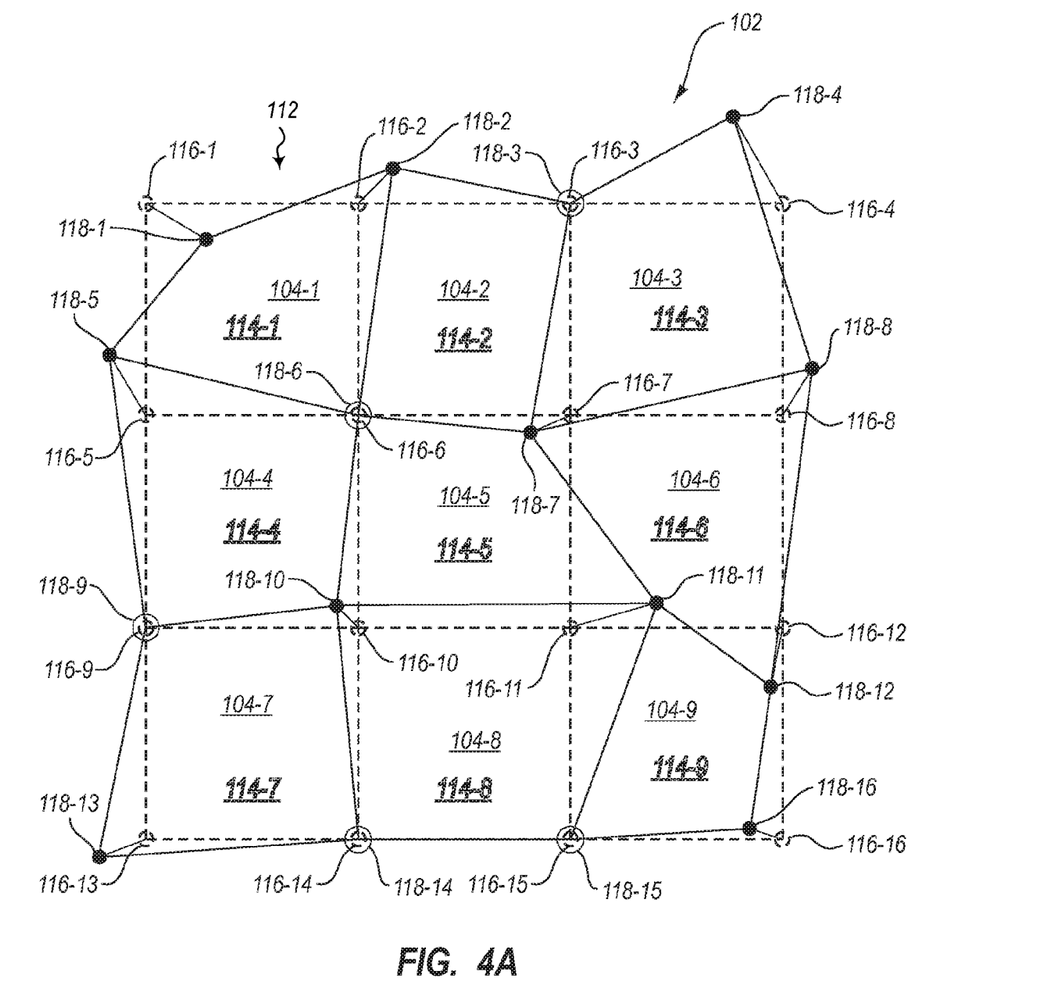
FIG. 4A illustrates an irregular grid super-imposed on a regular grid with corresponding vertex points.

Referring now to FIG. 4A, an example of these principles is illustrated. FIG. 4A illustrates a regular grid 112 illustrated in phantom. The regular grid 112 includes a plurality of rectangular quadrilaterals 114 (illustrated specifically as 114-1 through 114-9). The rectangular quadrilaterals 114 are defined by vertex points 116 (illustrates specifically as 116-1 through 116-16).

FIG. 4A further illustrates the irregular grid 102 superimposed on the regular grid 112. The irregular grid is illustrated with the irregular quadrilaterals 104. The irregular quadrilaterals 104 are defined by vertex points 118 (illustrated specifically as 118-1 through 118-16). The vertex points 118 may be obtained by providing the vertex points 116 to an oracle. In response, the oracle provides the vertex points 118.

Figure 5:
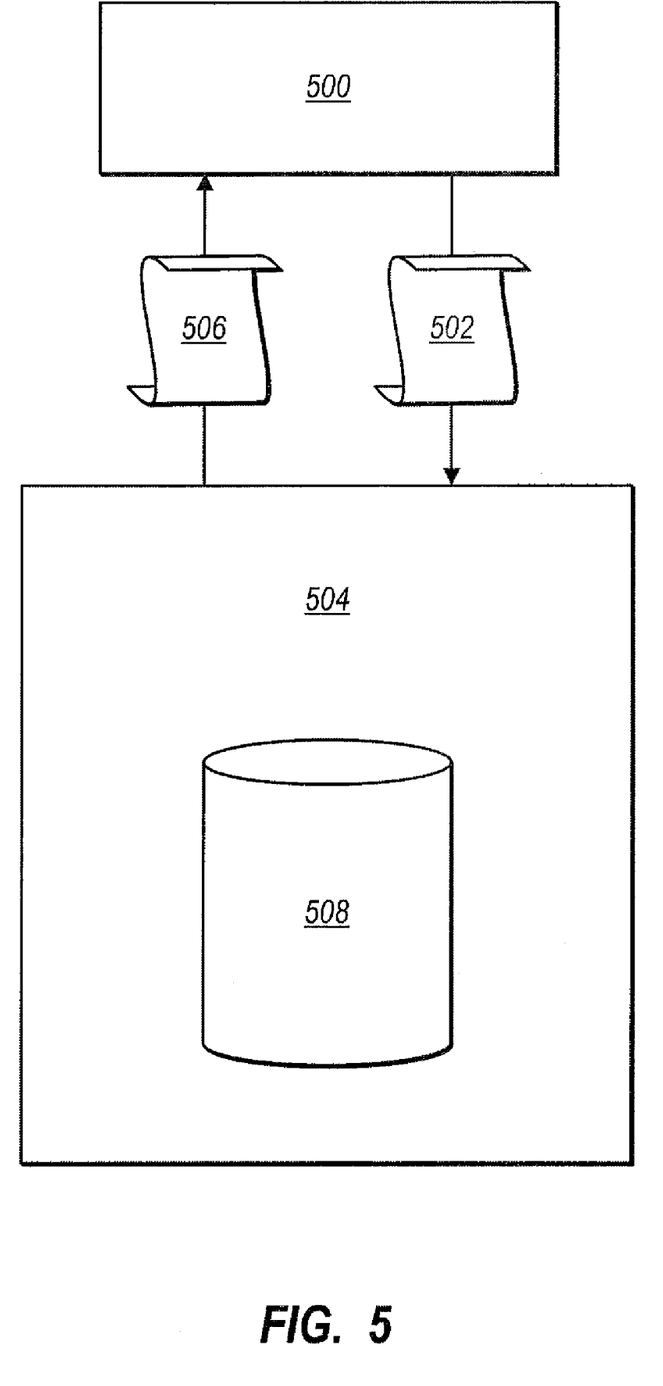
FIG. 5 illustrates computing systems for use in implementing some embodiments.

FIG. 5 illustrates a computing system 500. The computing system 500 may have a representation of the regular grid 112 as illustrated in FIG. 4A. The computing system may further include one or more modules, including computer executable instructions that when executed by a processor perform various functions. Among those functions may be included functionality for performing determinations regard convexity of quadrilaterals, triangulation of quadrilaterals, etc. The computing system 500 may send information 502 about vertex points 116 (see FIG. 4A) to an oracle 504. The oracle 504 may return information 506 about vertex points 118. For example, the information 506 about the vertex points 118 may include coordinates or a vector defining a displacement of a vertex point 118 from a vertex point 116. For example, the computing system 500 may provide information 502, such as coordinates, of vertex point 116-1 to the oracle 504. The oracle 504 in response provides information 506, such as coordinates or an offset vector, about the vertex point 118-1.

The oracle 504 includes a database 508 with information about graphical points. While the database 508 may not include information about all graphical points, the oracle 504 can use what information is included in the database to provide vertex points 118 that are near vertex points 116 provided by the computing system 500. An example is now illustrated.

To set the stage for a concrete example, imagine that some data is desired, such as height above sea level, at a collection of discrete, regularly spaced points on a map. The discrete regularly spaced points may include the vertex points 116 defining the grid 112. Information 502 about these points may be sent to a data source such as the oracle 504 to ask for additional information, such as height above sea level. The oracle is a source of data. As an example, oracles may be web sites such as Virtual Earth™ available from Microsoft® Corporation of Redmond Wash., or Google maps available from Google Inc. of Mountain View Calif. The oracle may not have data at each of the ask points, but it will have data at some nearby points. Imagine that every time the oracle is asked for the height above sea level at some ask point x, y, it responds with information 506 indicating either an indication that no answer is available or with a different answer x, y and a height, where the different answer x, y is near the ask x, y. Some definitions of near will be set forth further herein below.

A regular rectangular grid (e.g. grid 112) of points in 2-dimensional Euclidean space may be used. The grid 112 may be defined as a function of six constants, namely $x_0$, m, $\delta x$, $y_0$, n, $\delta y$, where m and n are integers $\geq 1$ and the other constants are real numbers. The grid 112 may be obtained by the following steps:

Specify an arithmetic progression of m values of x beginning with $x_0$ and increasing by $\delta x$ each step, in other words, construct the set xs={$x_\downarrow 0, x_\downarrow 1, x_\downarrow 2, \ldots, x_\downarrow(m-1)$}={$x_\downarrow 0, x_\downarrow 0+\delta x, x_\downarrow 0+2\delta x, \ldots, x_\downarrow 0+(m-1)\delta x$}={$x_\downarrow 0+i\delta x-1|i\epsilon[0 \ldots m)$}

Do likewise for n values of y beginning with $y_0$ and increasing by $\delta y$ each step, constructing the set ys={$y_0, y_1, y_2, \ldots, y_{n-1}$}={$y_0, y_0+\delta y, y_0+2\delta y, \ldots, y_0+(n-1)\delta y$}={$y_0+j\delta y|j\epsilon[0 \ldots n)$}

Construct the Cartesian product of these two sets, xs×ys which is the set of all ordered pairs of elements drawn from xs and ys: {$(x_0,y_0), (x_0,y_1), \ldots, (x_1,y_0), (x_1,y_1), \ldots, (x_{m-1}, y_{n-1})$}={$(x_0+i\delta x, y_0+j\delta y)|i\epsilon[0 \ldots m), j\epsilon[0 \ldots n)$}.

Interpret the values xs×ys as coordinates of points on the plane, as illustrated by the green grid labeled (A1) in Figure A below.

Figure 4B:
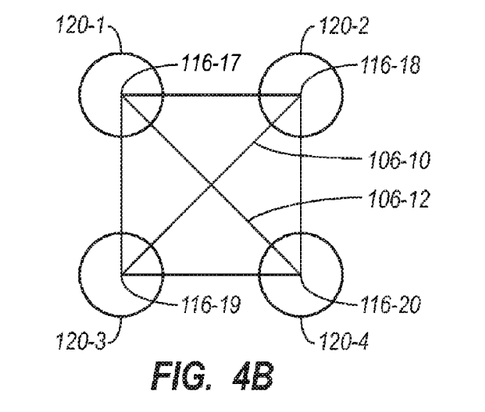
FIG. 4B illustrates a precise indication of allowed displacements of vertex points for squares.

Each grid point is uniquely labeled by its indices $i\epsilon[0 \ldots m), j\epsilon[0 \ldots n)$. The preceding simply represents a mathematical method of defining a regular grid with rectangular quadrilaterals with equally spaced vertex grid points. At each rectangular grid point $(x_i, y_j)$ (e.g. vertex points 116), an oracle 504 is consulted for displaced sample points (e.g. vertex points 118). In the example illustrated in FIG. 4A, the displace sample points are vertex points 118-1, 118-2, 118-4, 118-5, 118-7, 118-8, 118-10, 118-11, 118-12, 118-13, and 118-16. The oracle 504 may operate as a function that takes a rectangular grid point, e.g. vertex points 116 and returns either NULL or a triple, (x[i],y[j],z[i,j]) where z[i,j] represents samples of a target function z=f(x,y) at coordinates (x[i],y[j]), which are near coordinates $(x_i, y_j)$ in the sense that every quadrilateral 104 resulting from connecting nearest neighbors of displaced sample points 118 is convex and not concave. Thus, in some embodiments, the precise definition of "near" is that vertex points do not cause irregular quadrilaterals to be concave and not convex. In some embodiments, such as when an unperturbed rectangular quadrilateral is a square, this can be determined by determining that each vertex point in the irregular grid is displaced from the corresponding vertex point of the corresponding rectangular quadrilateral in the regular grid by no more than ¼ of the length of a diagonal defined by the vertex point in the rectangular quadrilateral in the regular grid and the diagonally opposed vertex point of the rectangular quadrilateral in the regular grid. For example, for point 118-1, a determination would be made that it is displaced from 116-1 by no more than ¼ of the length of the diagonal defined by vertex points 116-1 and 116-6. A more detailed example is illustrated in FIG. 4B. FIG. 4B illustrates a square rectangular quadrilateral formed by the vertex points 116-17, 116-18, 116-19, and 116-20. FIG. 4B also illustrates four circles 120-1, 120-2, 120-3, and 120-4 centered about the vertex points 116-17, 116-18, 116-19, and 116-20 respectively. Each of the circles 120-1, 120-2, 120-3, and 120-4 have a radius that is ¼ of the length of either of the diagonals 106-10 or 106-12. If an irregular quadrilateral has four vertex points, where one of the vertex points is in each of the circles 120-1, 120-2, 120-3, and 120-4, then the resultant irregular quadrilateral will be convex and not concave.

Figure 4C:
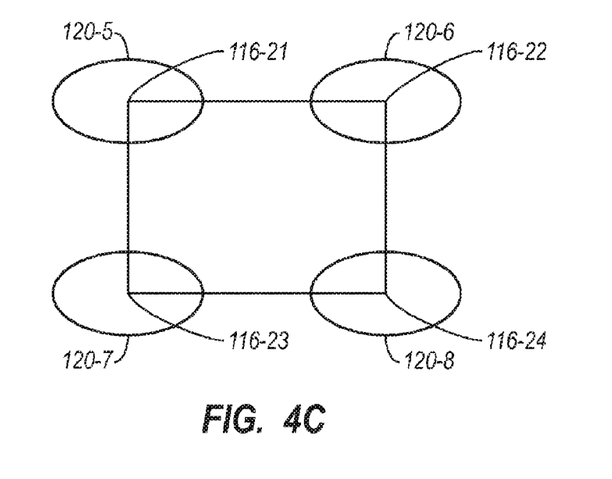
FIG. 4C illustrates a precise indication of allowed displacements of vertex points for non-square rectangles.

A similar analysis can be done for regular quadrilaterals that are rectangular, but not square. Referring now to FIG. 4C, and example is illustrated. FIG. 4C illustrates a non-square rectangular quadrilateral formed by the vertex points 116-21, 116-22, 116-23, and 116-24. FIG. 4C also illustrates four ellipses 120-5, 120-6, 120-7, and 120-8. To ensure that an irregular quadrilateral is convex and not concave, each vertex point is displaced from its original, rectangular position in such a way that it remains inside a certain ellipse, as illustrated in FIG. 4C. That is, let the height of each ellipse be $H/\sqrt{2}$, where H is the vertical distance from 116-21 to 116-22 (or 116-23 to 116-24), and let the width of each ellipse be $W/\sqrt{2}$, where W is the horizontal distance from 116-21 to 116-22 (or 116-23 to 116-24). So long as displaced vertices of the irregular quadrilateral remain anywhere inside these ellipses 120-5, 120-6, 120-7, and 120-8, the resulting irregular quadrilateral is guaranteed to be convex and not concave. Said another way, there is no way to draw a non-convex, concave quadrilateral from four points chosen, one from inside each of the four ellipses.

Figure 4D:
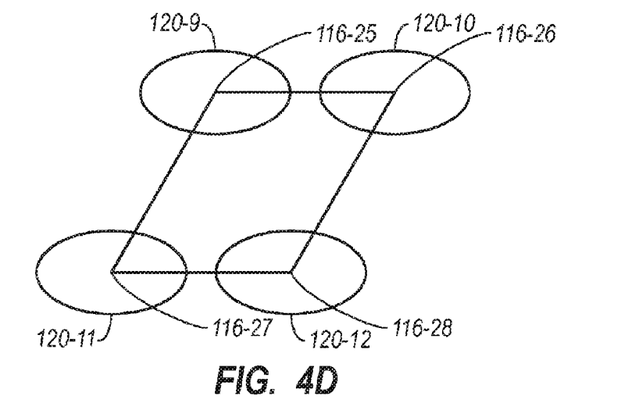
FIG. 4D illustrates a precise indication of allowed displacements of vertex points for non-rectangular parallelograms.

FIG. 4D further illustrates an example where an unperturbed quadrilateral that is a non-rectangular quadrilateral can be used to determine if an irregular quadrilateral is convex and not concave. In particular, the unperturbed quadrilateral formed by vertex points 116-25, 116-26, 116-27 and 116-28 can have these points displaced within the ellipses 120-9, 120-10, 120-11, and 120-12 respectively, such that the resultant displaced quadrilateral is still nonetheless convex and not concave.

When a NULL is returned from the oracle 504, the NULL values returned by the oracle are replaced with the original rectangular grid point and a value of the function determined by standard methods of interpolation or extrapolation. After this step, there are values for the coordinates (x[i],y[j]) for every i,j in the original rectangular grid, and values (or approximations from interpolation or extrapolation) for the desired function f(x[i],y[j])=z[i,j] such that all the quadrilaterals q(i,j)={((x[i],y[j]),(x[i+1],y[j]),(x[i],y[j+1]),(x[i+1],y[j+1]))|$i\epsilon[0 \ldots m-1), j\epsilon0 \ldots n-1$)} are geometrically convex.

In some embodiments two different triangulations available: biased and non-biased. The biased triangulation replaces each quadrilateral q(i,j) with two triangles such as is shown in FIG. 2. The non-biased triangulation replaces each irregular quadrilateral 104 with four triangles as in FIG. 3. To complete the triangulation, linear interpolation is used to get coordinates and function values. This interpolation is completely standard and straightforward from this point on.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Figure 6:
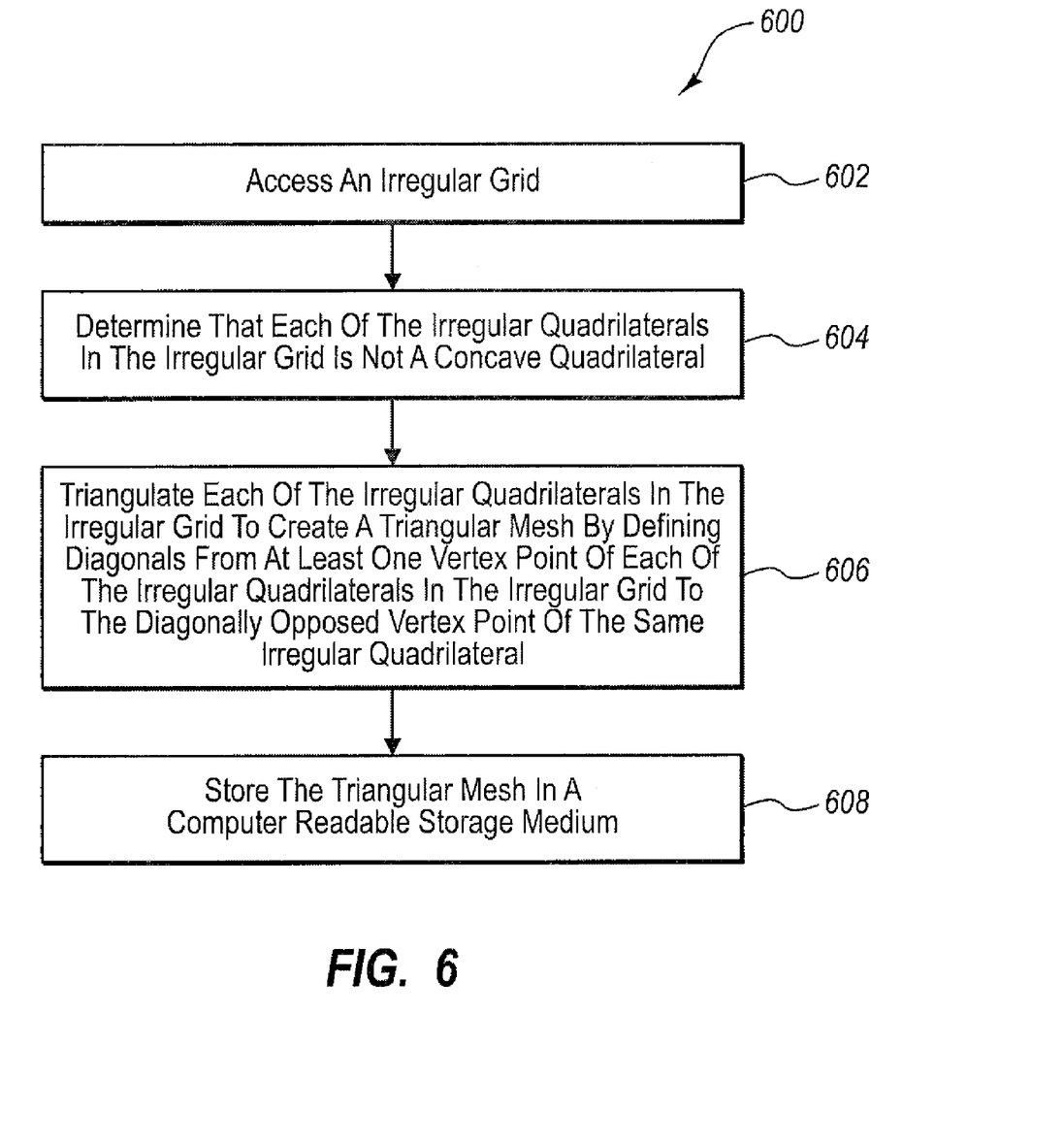
FIG. 6 illustrates a method of triangulating an irregular grid.

Referring now to FIG. 6, a method 600 is illustrated. The method 600 may be practiced in a computing environment, such as the computing environment illustrated in FIG. 5. The method 600 is a computer implemented method of triangulating quadrilaterals. The method includes accessing an irregular grid (act 602). The irregular grid include a plurality of irregular quadrilaterals. An example of such a grid is illustrated by the grid 102 illustrated in FIG. 1. Accessing the grid, may include for example, accessing a computer readable storage medium storing representations of vertex points, vectors, or other representations. In some embodiments, accessing an irregular grid includes providing vertex points of rectangular quadrilaterals from a regular grid to an oracle, and receiving corresponding vertex points for irregular quadrilaterals of an irregular grid from the oracle.

The method 600 further includes determining that each of the irregular quadrilaterals in the irregular grid is not a concave quadrilateral (act 604). As illustrated in FIG. 1, each of the quadrilaterals in the grid 102 is convex, and thus not concave. Quadrilateral 104-10 is an example of a concave quadrilateral. In some embodiments, each of the irregular quadrilaterals in the irregular grid corresponds to a rectangular quadrilateral in a regular grid. Vertex points in a given irregular quadrilateral among the plurality of irregular quadrilaterals correspond to vertex points of a given rectangular quadrilateral in the regular grid. At least some vertex points in the irregular grid are displaced some distance from corresponding vertex points in the regular grid. Determining that each of the irregular quadrilaterals in the irregular grid is not a concave quadrilateral may include in some embodiments, determining that each vertex point in the irregular grid is displaced from the corresponding vertex point of the corresponding rectangular quadrilateral in the regular grid by no more than ¼ of the length of a diagonal defined by the vertex point in the rectangular quadrilateral in the regular grid and the diagonally opposed vertex point of the rectangular quadrilateral in the regular grid towards the diagonally opposed vertex point. For example, referring now to FIG. 4A, a determination can be made that the vertex point 118-1 is displaced from the vertex point 116-1 by no more than ¼ of the length of the diagonal defined by vertex point 116-1 and vertex point 116-6. A similar analysis can be performed for the remaining vertex points 118 using the vertex points 116.

FIG. 6 further illustrates triangulating each of the irregular quadrilaterals in the irregular grid to create a triangular mesh by defining diagonals from at least one vertex point of each of the irregular quadrilaterals in the irregular grid to the diagonally opposed vertex point of the same irregular quadrilateral (act 606). In some embodiments, this may be performed on a grid basis (i.e. for an entire grid) and as a result of determining that each of the irregular quadrilaterals in the irregular grid is not a concave quadrilateral. FIGS. 2 and 3 illustrate examples of this triangulation act.

Illustratively, triangulating each of the irregular quadrilaterals in the irregular grid may include defining only a single diagonal for each irregular quadrilateral in the irregular grid. Examples of this are illustrated in FIG. 2 by the diagonals 106-1 through 106-9. Defining only a single diagonal for each irregular quadrilateral in the irregular grid may be performed by defining similarly oriented diagonals for all of irregular quadrilaterals such that a biased triangulation is created. This is illustrated in FIG. 2, where all diagonals 106 extend from lower left vertex points to upper right vertex points. Alternatively, defining only a single diagonal for each irregular quadrilateral in the irregular grid may include defining diagonals in alternate orientations for the irregular quadrilaterals in the irregular grid such that a triangulation with a reduced or no bias is created. In yet another alternative embodiment, defining only a single diagonal for each irregular quadrilateral in the irregular grid may include defining diagonal orientations for the irregular quadrilaterals in the irregular grid in a random or pseudo-random fashion such that a triangulation with a reduced or no bias is created. Other methods of assigning diagonal orientation may also be used.

The method 600 may be performed where triangulating each of the irregular quadrilaterals in the irregular grid comprises defining both diagonals for each irregular quadrilateral in the irregular grid such that a non-biased triangulation comprising four triangles per irregular quadrilateral is created. An example of this is illustrated in FIG. 3. For example, FIG. 3 illustrates both diagonals 106-1 and 106-2 for the irregular quadrilateral 104-1.

Returning once again to FIG. 6, the method 600 further includes storing the triangular mesh in a computer readable storage medium that can be accessed by an application. The application can be used for tasks such as data visualization, computer graphics, or computational geometry.

Figure 7:
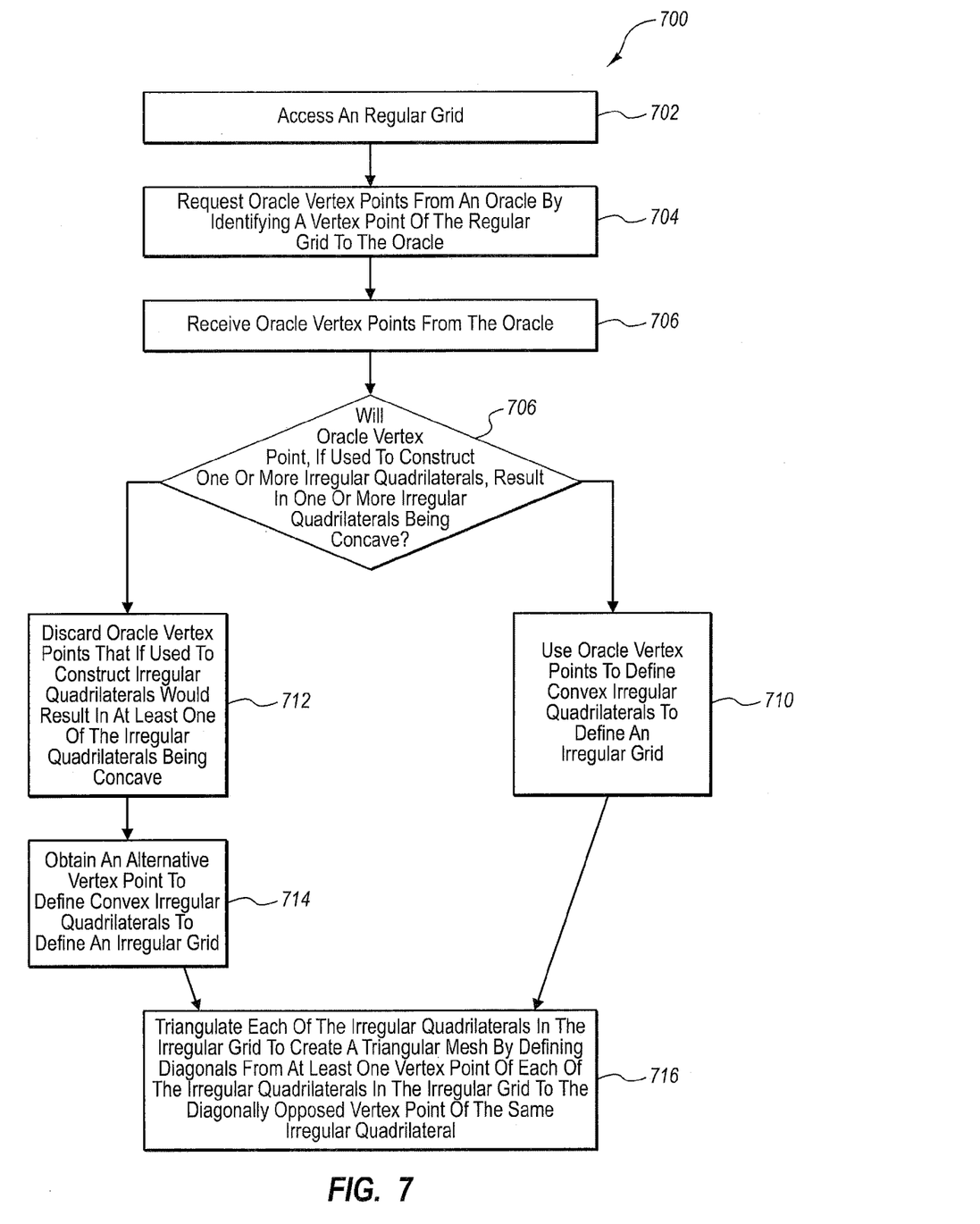
FIG. 7 illustrates a method of obtaining points from an oracle and constructing an irregular grid, and triangulating the irregular grid.

Referring now to FIG. 7, another method 700 is illustrated. The method 700 may be practiced in a computing environment, such as the computing environment illustrated in FIG. 5. The method 700 is a computer implemented method of triangulating quadrilaterals. The method 700 includes accessing a regular grid (act 702). The regular grid includes a plurality of rectangular quadrilaterals. The rectangular quadrilaterals are defined by vertex points of the regular grid. An example of a regular grid is illustrated at 112 in FIG. 4A, including vertex points 116.

The method 700 further includes requesting one or more oracle vertex points from an oracle by identifying one or more vertex points of the regular grid to the oracle (act 704). For example, as illustrated in FIG. 5, the computing system 500 may send information 502 about vertex points 116 to the oracle 504.

The method 700 further includes receiving one or more oracle vertex points from the oracle (act 706). For example, the oracle 504 illustrated in FIG. 5 may return information 506, such as information about vertex points 118.

The method 700 further includes determining whether or not oracle vertex points, if used to construct one or more irregular quadrilaterals, would result in at least one of the one or more irregular quadrilaterals being concave (act 708).

Any oracle points that will not result in irregular quadrilaterals being concave can be used to define convex irregular quadrilaterals to define an irregular grid (act 710). Any oracle vertex points that if used to construct irregular quadrilaterals would result in at least one of the irregular quadrilaterals being concave are discarded (act 712). For these points, the method 700 includes obtaining alternative vertex points to define convex irregular quadrilaterals to define the irregular grid (act 714).

FIG. 7 further illustrates that the method 700 includes triangulating each of the irregular quadrilaterals (defined using either oracle vertex points and/or alternative vertex points) in the irregular grid to create a triangle mesh by defining diagonals from at least one vertex point of each of the irregular quadrilaterals in the irregular grid to the diagonally opposed vertex point of the same irregular quadrilateral (act 716). As noted, this can be performed in a number of ways including creating a biased triangulation using only a single diagonal for each quadrilateral, minimizing biasing even though only a single diagonal is used, creating an unbiased triangulation by defining both diagonals, etc.

The method 700 may be performed where using one or more alternative vertex points in alternative to the discarded vertex points includes using a vertex point in the rectangular quadrilateral identified in the act of requesting one or more oracle vertex points to obtain a first discarded vertex point received from the oracle in place of the first discarded vertex point. For example, and referring to FIG. 4A, while vertex point 118-1 does not cause a concave quadrilateral to be formed, assuming that it would, the vertex point 116-1 could be used as an alternative.

In an alternative embodiment, the method 700 may be performed where using one or more alternative vertex points in alternative to the discarded vertex points includes obtaining an alternative vertex point by interpolation of other vertex points in close proximity to the discarded vertex point. For example, cubic splines or linear interpolation of nearby oracle vertex points may be used.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a computer implemented method of triangulating quadrilaterals, the method comprising:

accessing an irregular grid comprising a plurality of irregular quadrilaterals;

determining that each of the irregular quadrilaterals in the irregular grid is a convex quadrilateral;

on a grid basis and as a result of determining that each of the irregular quadrilaterals in the irregular grid is a convex quadrilateral, triangulating each of the irregular quadrilaterals in the irregular grid to create a triangular mesh by defining diagonals from at least one vertex point of each of the irregular quadrilaterals in the irregular grid to the diagonally opposed vertex point of the same irregular quadrilateral;

storing the triangular mesh in a computer readable storage medium that can be accessed by an application for at least one of data visualization, computer graphics, or computational geometry; and wherein each of the irregular quadrilaterals in the irregular grid corresponds to a quadrilateral in a regular grid such that vertex points in a given irregular quadrilateral among the plurality of irregular quadrilaterals corresponds to vertex points of a given quadrilateral in the regular grid, the regular grid corresponding to the irregular grid, wherein at least some vertex points in the irregular grid are displaced some distance from corresponding vertex points in the regular grid, and wherein determining that each of the irregular quadrilaterals in the irregular grid is a convex quadrilateral comprises determining that each vertex point in the irregular grid is displaced from the corresponding vertex point of the corresponding quadrilateral in the regular grid by being placed within the boundaries of an ellipse centered about the corresponding vertex points in the regular grid.

2. The method of claim 1, wherein each of the irregular quadrilaterals in the irregular grid corresponds to a square rectangular quadrilateral in a regular grid such that vertex points in a given irregular quadrilateral among the plurality of irregular quadrilaterals corresponds to vertex points of a given square rectangular quadrilateral in the regular grid, the regular grid corresponding to the irregular grid, wherein at least some vertex points in the irregular grid are displaced some distance from corresponding vertex points in the regular grid, and wherein determining that each of the irregular quadrilaterals in the irregular grid is a convex quadrilateral comprises determining that each vertex point in the irregular grid is displaced from the corresponding vertex point of the corresponding square rectangular quadrilateral in the regular grid by no more than ¼ of the length of a diagonal defined by the vertex point in the rectangular quadrilateral in the regular grid and the diagonally opposed vertex point of the rectangular quadrilateral in the regular grid.

3. The method of claim 1, wherein triangulating each of the irregular quadrilaterals in the irregular grid comprises defining only a single diagonal for each irregular quadrilateral in the irregular grid.

4. The method of claim 3, wherein defining only a single diagonal for each irregular quadrilateral in the irregular grid comprises defining similarly oriented diagonals for all of irregular quadrilaterals such that a biased triangulation is created.

5. The method of claim 3, wherein defining only a single diagonal for each irregular quadrilateral in the irregular grid comprises defining diagonals in alternate orientations for the irregular quadrilaterals in the irregular grid such that a triangulation with a reduced or no bias is created.

6. The method of claim 3, wherein defining only a single diagonal for each irregular quadrilateral in the irregular grid comprises defining diagonal orientations for the irregular quadrilaterals in the irregular grid in a random or pseudo-random fashion such that a triangulation with a reduced or no bias is created.

7. The method of claim 1, wherein triangulating each of the irregular quadrilaterals in the irregular grid comprises defining both diagonals for each irregular quadrilateral in the irregular grid such that a non-biased triangulation comprising four triangles per irregular quadrilateral is created.

8. The method of claim 1, wherein each of the irregular quadrilaterals in the irregular grid corresponds to a rectangular quadrilateral in a regular grid such that vertex points in a given irregular quadrilateral among the plurality of irregular quadrilaterals corresponds to vertex points of a given rectangular quadrilateral in the regular grid, the regular grid corresponding to the irregular grid, wherein at least some vertex points in the irregular grid are displaced some distance from corresponding vertex points in the regular grid, and wherein accessing an irregular grid comprises providing vertex points of rectangular quadrilaterals from the regular grid to an oracle, and receiving corresponding vertex points for irregular quadrilaterals of the irregular grid from the oracle.

9. In a computing environment, a computer implemented method of triangulating quadrilaterals, the method comprising:
  accessing a regular grid comprising a plurality of rectangular quadrilaterals, the rectangular quadrilaterals being defined by vertex points of the regular grid, requesting one or more oracle vertex points from an oracle by identifying one or more vertex points of the regular grid to the oracle to request corresponding oracle vertex points;
  receiving one or more oracle vertex points from the oracle, each of the oracle vertex points corresponding to one of the vertex points of the regular grid;
  determining that one or more of the oracle vertex point, if used to construct one or more irregular quadrilaterals, would result in at least one of the one or more irregular quadrilaterals being not convex; as a result, discarding the one or more oracle vertex points that if used to construct one or more irregular quadrilaterals would result in at least one of the one or more irregular quadrilaterals being not convex;
  using one or more alternative vertex points in alternative to the discarded vertex points to define one or more irregular quadrilateral to define an irregular grid comprising a plurality of irregular quadrilaterals, wherein using the alternative points does not cause the one or more irregular quadrilaterals to be not convex, and wherein each of the irregular quadrilaterals in the irregular grid corresponds to a rectangular quadrilateral in the regular grid such that vertex points of the quadrilateral among the plurality of irregular quadrilaterals correspond to vertex points of the rectangular quadrilaterals in the regular grid, the regular grid corresponding to the irregular grid, wherein at least some vertex points in the irregular grid are displaced some distance from corresponding vertex points in the regular grid; and
  on a grid basis, triangulating each of the irregular quadrilaterals in the irregular grid to create a triangle mesh by defining diagonals from at least one vertex point of each of the irregular quadrilaterals in the irregular grid to the diagonally opposed vertex point of the same irregular quadrilateral.

10. The method of claim 9, wherein using one or more alternative vertex points in alternative to the discarded vertex points comprises using a vertex point in the rectangular quadrilateral identified in the act of requesting one or more oracle vertex points to obtain a first discarded vertex point received from the oracle in place of the first discarded vertex point.

11. The method of claim 9, wherein using one or more alternative vertex points in alternative to the discarded vertex points comprises obtaining an alternative vertex point by interpolation of other vertex points in close proximity.

12. The method of claim 9, wherein determining that one or more of the oracle vertex point, if used to construct one or more irregular quadrilaterals, would result in at least one of the one or more irregular quadrilaterals being not convex comprises determining that a given oracle vertex points is displaced from the corresponding vertex point in the regular grid, the regular grid comprising square quadrilaterals, by no more than ¼ of the length of a diagonal defined by the vertex point in the square rectangular quadrilateral in the regular grid and the diagonally opposed vertex point of the square rectangular quadrilateral in the regular grid.

13. The method of claim 9, wherein triangulating each of the irregular quadrilaterals in the irregular grid comprises defining only a single diagonal for each irregular quadrilateral in the irregular grid.

14. The method of claim 13, wherein defining only a single diagonal for each irregular quadrilateral in the irregular grid comprises defining similarly oriented diagonals for all of irregular quadrilaterals such that a biased triangulation is created.

15. The method of claim 13, wherein defining only a single diagonal for each irregular quadrilateral in the irregular grid comprises defining diagonals in alternate orientations for the irregular quadrilaterals in the irregular grid such that a triangulation with a reduced or no bias is created.

16. The method of claim 13, wherein defining only a single diagonal for each irregular quadrilateral in the irregular grid comprises defining diagonal orientations for the irregular quadrilaterals in the irregular grid in a random or pseudo-random fashion such that a triangulation with a reduced or no bias is created.

17. The method of claim 9, wherein triangulating each of the irregular quadrilaterals in the irregular grid comprises defining both diagonals for each irregular quadrilateral in the irregular grid such that a non-biased triangulation comprising four triangles per irregular quadrilateral is created.

18. In a computing environment, a system for triangulating quadrilaterals, the system comprising:
- an oracle system, wherein the oracle comprises a database including information about graphical points, and wherein the oracle system comprises computer modules configured to receive data points from other systems and to provide the other systems with corresponding points from the database;
- a first computing system, wherein the first computing system comprises one or more computer modules configured to perform the following:
- access an irregular grid comprising a plurality of irregular quadrilaterals, wherein at least a portion of the quadrilaterals are defined by points received from the oracle system, wherein each of the irregular quadrilaterals in the irregular grid corresponds to a quadrilateral in a regular grid such that vertex points in a given irregular quadrilateral among the plurality of irregular quadrilaterals corresponds to vertex points of a given quadrilateral in the regular grid, the regular grid corresponding to the irregular grid, wherein at least some vertex points in the irregular grid are displaced some distance from corresponding vertex points in the regular grid, and wherein accessing an irregular grid comprises providing vertex points of quadrilaterals from the regular grid to the oracle system, and receiving corresponding vertex points for irregular quadrilaterals of the irregular grid from the oracle system;
- determine that each of the irregular quadrilaterals in the irregular grid is a convex quadrilateral;
- on a grid basis and as a result of determining that each of the irregular quadrilaterals in the irregular grid is a convex quadrilateral, triangulate each of the irregular quadrilaterals in the irregular grid to create a triangular mesh by defining diagonals from at least one vertex point of each of the irregular quadrilaterals in the irregular grid to the diagonally opposed vertex point of the same irregular quadrilateral; and
- store the triangular mesh in a computer readable storage medium that can be accessed by an application for at least one of data visualization, computer graphics, or computational geometry.

19. The system of claim 18, wherein the first computing system comprises one or more modules configured to perform the following:
- determine that one or more of the oracle vertex point, if used to construct one or more irregular quadrilaterals, would result in at least one of the one or more irregular quadrilaterals being not convex;
- as a result, discard the one or more oracle vertex points that if used to construct one or more irregular quadrilaterals would result in at least one of the one or more irregular quadrilaterals being not convex; and
- generate one or more alternative vertex points in alternative to the discarded vertex points to define one or more irregular quadrilateral to define an irregular grid comprising a plurality of irregular quadrilaterals that are convex.

20. The method of claim 19, wherein the module configured to generate one or more alternative vertex points in alternative to the discarded vertex points is configured to generate an alternative vertex point by interpolation of other vertex points in close proximity.

* * * * *